United States Patent
Rousseau et al.

(10) Patent No.: US 12,038,517 B2
(45) Date of Patent: Jul. 16, 2024

(54) INTEGER AMBIGUITY SEARCH SPACE REDUCTION

(71) Applicant: QUALCOMM Incorporated, San Diego, CA (US)

(72) Inventors: Jean-Michel Rousseau, San Diego, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/479,825

(22) Filed: Sep. 20, 2021

(65) Prior Publication Data

US 2023/0090412 A1    Mar. 23, 2023

(51) Int. Cl.
| | |
|---|---|
| *G01S 19/44* | (2010.01) |
| *G01S 13/87* | (2006.01) |
| *G01S 19/46* | (2010.01) |
| *H04W 4/029* | (2018.01) |

(52) U.S. Cl.
CPC ............ *G01S 19/44* (2013.01); *G01S 13/876* (2013.01); *G01S 19/46* (2013.01); *H04W 4/029* (2018.02)

(58) Field of Classification Search
CPC ........ G01S 13/876; G01S 19/44; G01S 19/45; G01S 19/46; H04W 4/029
See application file for complete search history.

(56) References Cited

U.S. PATENT DOCUMENTS

| | | | |
|---|---|---|---|
| 6,469,663 B1 | 10/2002 | Whitehead et al. | |
| 2011/0102254 A1* | 5/2011 | Fenton | G01S 19/44 342/357.27 |
| 2018/0074211 A1 | 3/2018 | Niesen et al. | |
| 2019/0302274 A1* | 10/2019 | Berntorp | G01S 19/393 |

FOREIGN PATENT DOCUMENTS

| | | |
|---|---|---|
| WO | 2009129507 A2 | 10/2009 |
| WO | 2019201846 A1 | 10/2019 |

OTHER PUBLICATIONS

International Search Report and Written Opinion—PCT/US2022/041021—ISA/EPO—dated Dec. 13, 2022.

* cited by examiner

*Primary Examiner* — Timothy X Pham
(74) *Attorney, Agent, or Firm* — QUALCOMM Incorporated

(57) ABSTRACT

A method of determining an integer ambiguity search space includes: obtaining, at an apparatus, a code phase measurement of a satellite vehicle signal comprising a pseudorandom noise code and a carrier signal; obtaining, at the apparatus, spatial information corresponding to a wireless terrestrial signal transferred between the apparatus and a terrestrial base station; determining, at the apparatus, a satellite positioning system carrier phase integer ambiguity search space based on the code phase measurement; and constraining a size of the satellite positioning system carrier phase integer ambiguity search space based on the spatial information.

28 Claims, 12 Drawing Sheets

INTEGER AMBIGUITY SEARCH SPACE REDUCTION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, an apparatus includes: a receiver; a memory; and a processor communicatively coupled to the receiver and the memory and configured to: obtain a code phase measurement of a satellite vehicle signal received via the receiver, the satellite vehicle signal comprising a pseudorandom noise code and a carrier signal; obtain spatial information corresponding to a wireless terrestrial signal transferred between the apparatus and a terrestrial base station; and determine a satellite positioning system carrier phase integer ambiguity search space based on the code phase measurement; where the processor is configured to constrain a size of the satellite positioning system carrier phase integer ambiguity search space based on the spatial information.

In an embodiment, a method of determining an integer ambiguity search space includes: obtaining, at an apparatus, a code phase measurement of a satellite vehicle signal comprising a pseudorandom noise code and a carrier signal; obtaining, at the apparatus, spatial information corresponding to a wireless terrestrial signal transferred between the apparatus and a terrestrial base station; determining, at the apparatus, a satellite positioning system carrier phase integer ambiguity search space based on the code phase measurement; and constraining a size of the satellite positioning system carrier phase integer ambiguity search space based on the spatial information.

In an embodiment, an apparatus includes: means for obtaining a code phase measurement of a satellite vehicle signal comprising a pseudorandom noise code and a carrier signal; means for obtaining spatial information corresponding to a wireless terrestrial signal transferred between the apparatus and a terrestrial base station; means for determining a satellite positioning system carrier phase integer ambiguity search space based on the code phase measurement; and means for constraining a size of the satellite positioning system carrier phase integer ambiguity search space based on the spatial information.

In an embodiment, a non-transitory, processor-readable storage medium includes processor-readable instructions to cause a processor, of an apparatus, to: obtain a code phase measurement of a satellite vehicle signal comprising a pseudorandom noise code and a carrier signal; obtain spatial information corresponding to a wireless terrestrial signal transferred between the apparatus and a terrestrial base station; determine a satellite positioning system carrier phase integer ambiguity search space based on the code phase measurement; and constrain a size of the satellite positioning system carrier phase integer ambiguity search space based on the spatial information.

DETAILED DESCRIPTION

Figure 1:
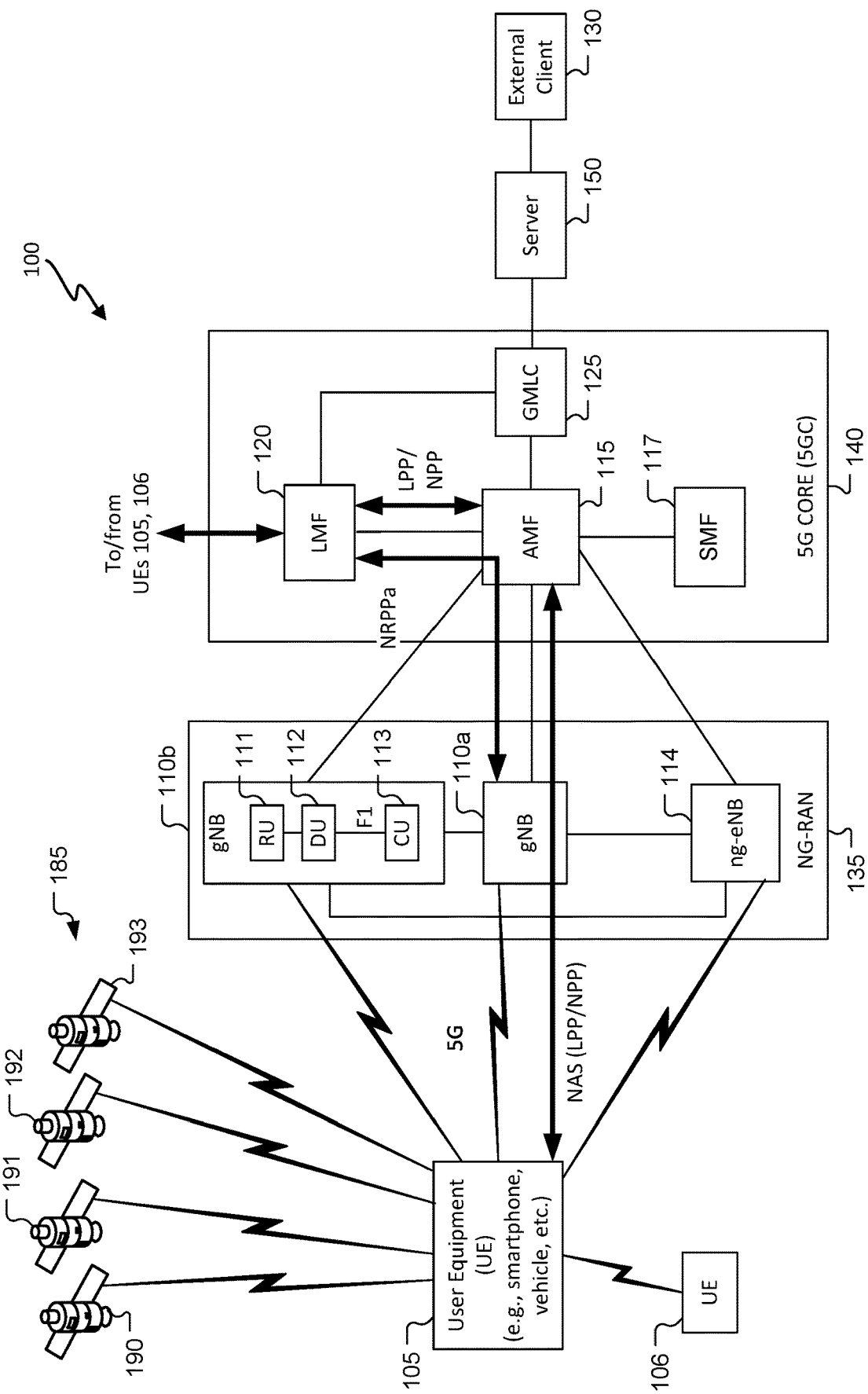
FIG. 1 is a simplified diagram of an example wireless communications system.

Techniques are discussed herein for reducing an integer ambiguity search space for determining a total carrier phase of a satellite signal between a satellite and a receiver. Spatial information determined from one or more terrestrial-based signals may be used to determine a spatial constraint on a location of a receiver. The spatial constraint is used to bound an integer ambiguity search space for determining an integer number of cycles of a carrier signal of a satellite signal between the satellite and the receiver. For example, an error ellipse (or other shape, e.g., an irregular shape) corresponding to the search space may be bound by a position estimate of the receiver relative to a terrestrial base station and an uncertainty of the position estimate. As another example, the error ellipse may be bound by a range from a terrestrial base station to the receiver and an uncertainty of the range. As another example, the error ellipse may be bound by an angle of the receiver relative to a terrestrial base station and an uncertainty of the angle. As another example, combinations of multiple spatial constraints may be used, e.g., multiple range constraints, multiple angle constraints, a position estimate and one or more angle constraints and/or or one or more range constraints, one or more range constraints and one or more angle constraints, etc. Other configurations, however, may be used.

Items and/or techniques described herein may provide one or more of the following capabilities, as well as other capabilities not mentioned. High-accuracy positioning may be achieved using terrestrial-based positioning reference signals in combination with satellite positioning signals. Carrier phase ambiguity resolution for high-precision positioning may be achieved faster, especially in non-open-sky environments. High-precision satellite-signal measurements may be achieved in environments in which such measurements previously could not be achieved. Satellite positioning signal acquisition speed and/or sensitivity may be improved. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 containing a satellite vehicle (SV) 190, an SV 191, an SV 192, and an SV 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
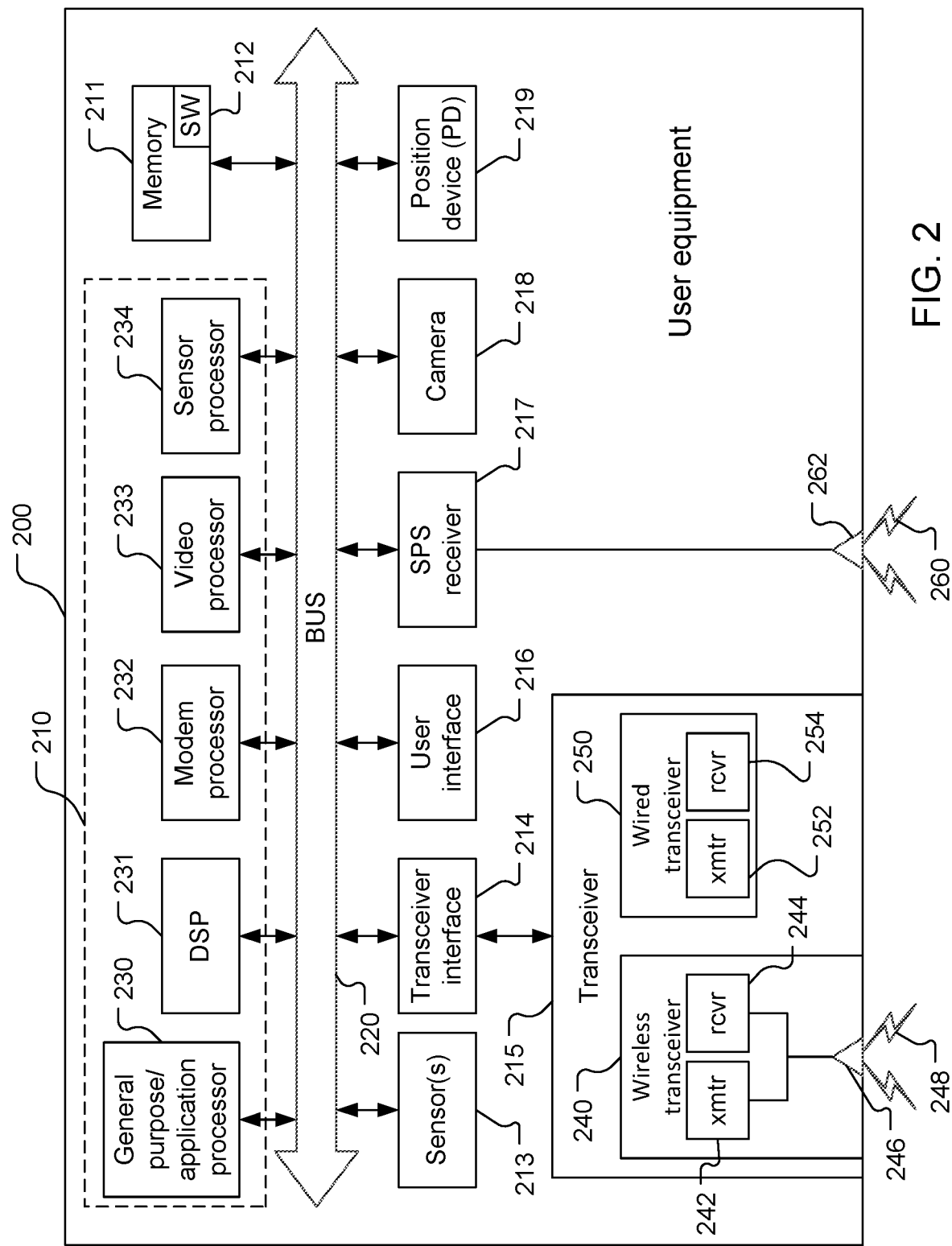
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
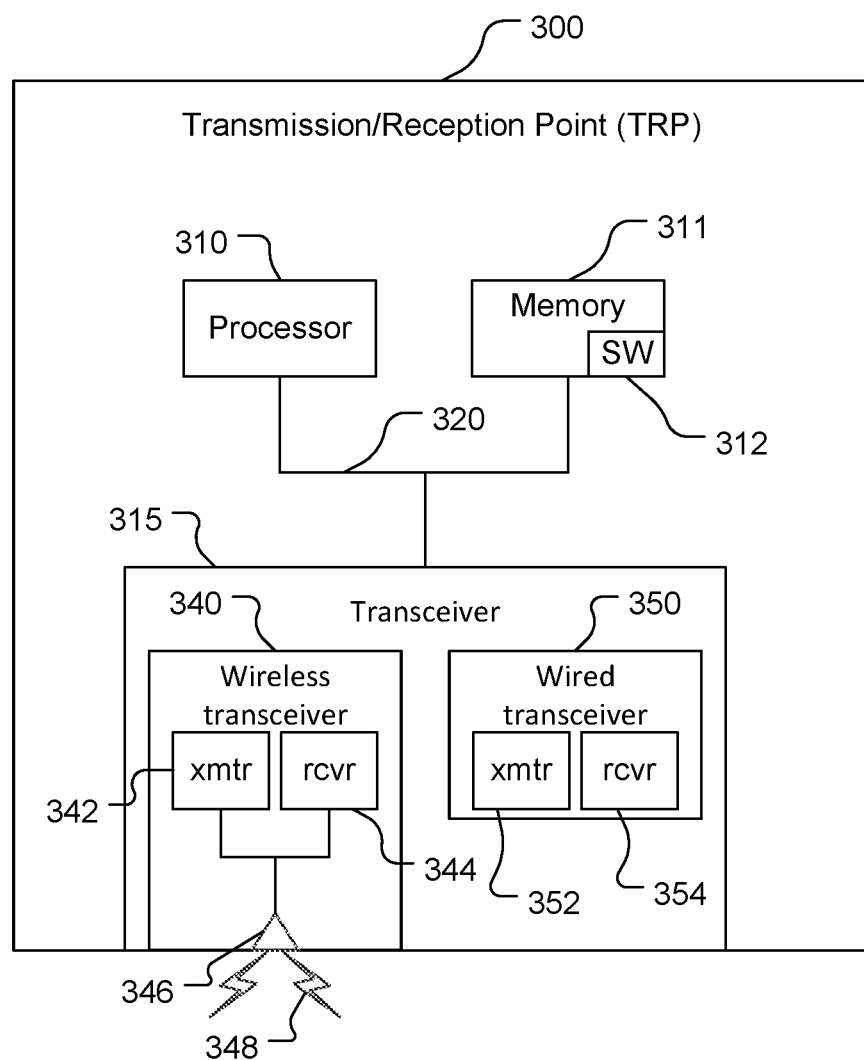
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
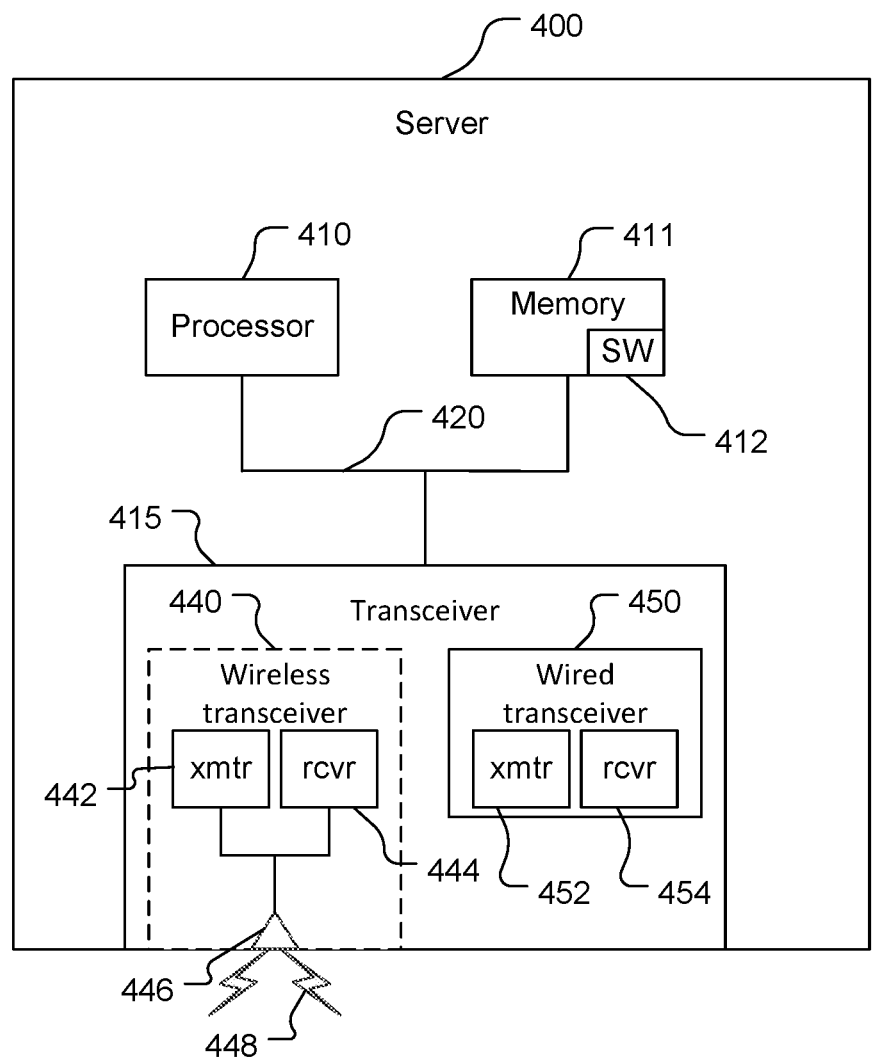
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may be generated using a PN code (pseudorandom number code) (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Carrier-Phase-Based Positioning

A GNSS receiver may measure satellite vehicle signals (SV signals) to determine a location of the GNSS receiver. For example, a UE may measure times of arrival of codes in SV signals and estimate a location, or provide measurement information to another device such as a location server that estimates a location, of the UE using the times of arrival. The location of the UE may be more-accurately determined using carrier-phase measurements of the SV signals and one or more positioning techniques such as RTK or PPP.

Figure 5:
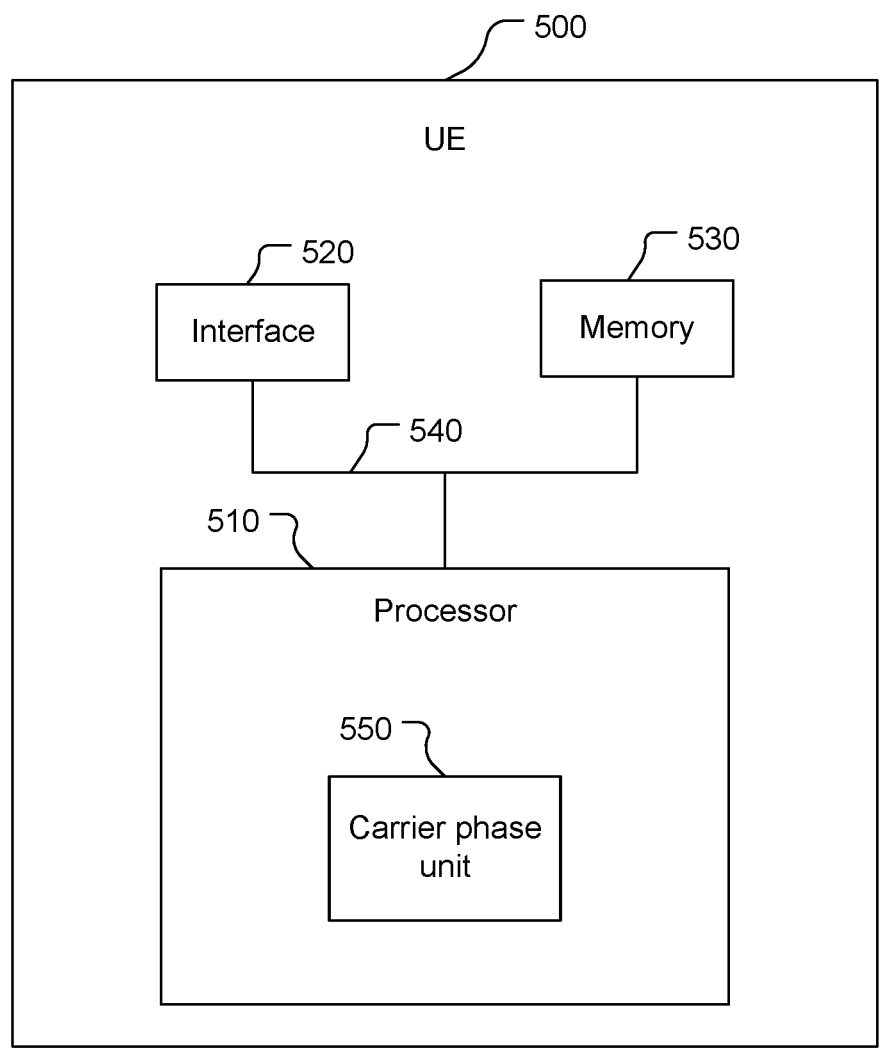
FIG. 5 is a simplified diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520)

includes a carrier phase unit 550. The configuration and functionality of the carrier phase unit 550 is discussed further herein, with the carrier phase unit 550 being configured to perform the functionality described as being performed by the carrier phase unit 550.

Figure 6:
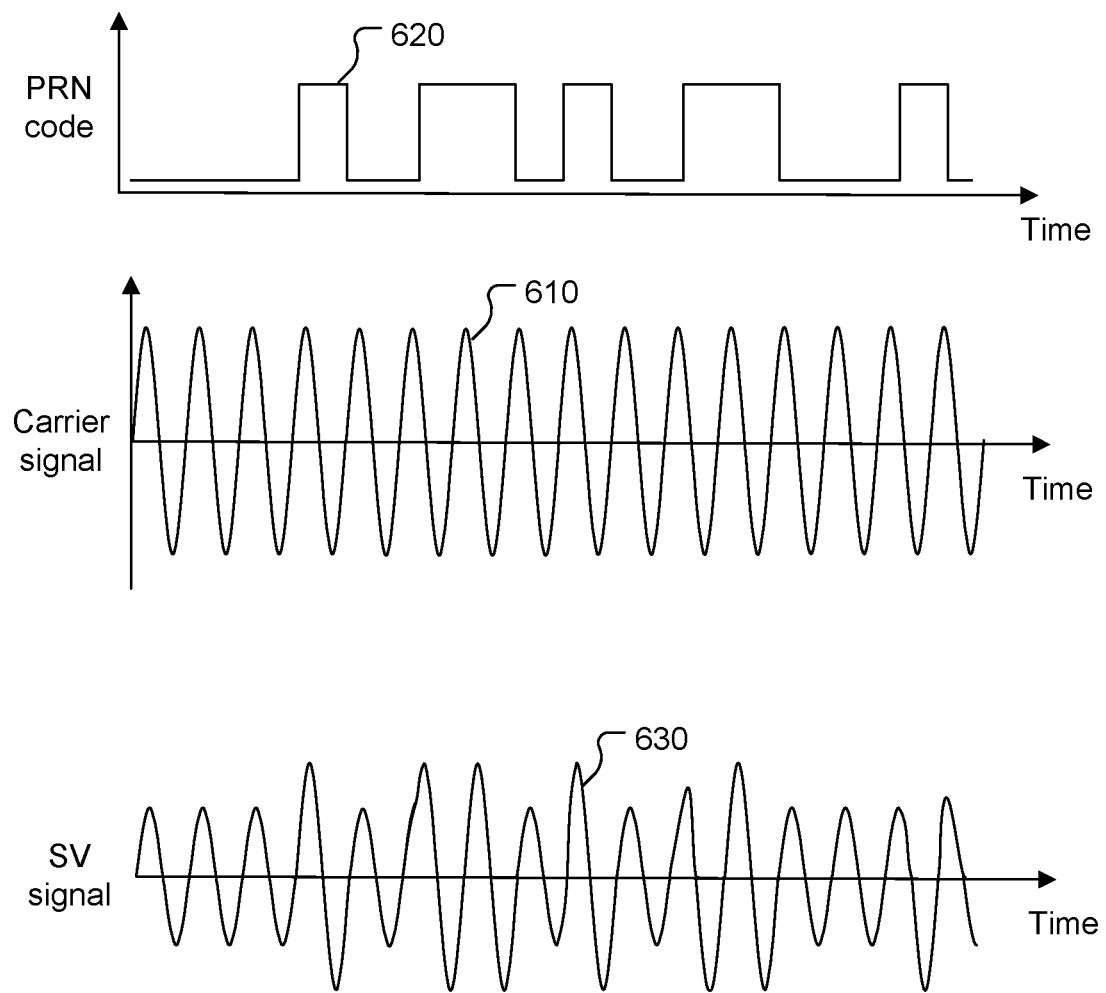
FIG. 6 is a timing diagram of a carrier wave signal and a code phase modulation signal included in a satellite vehicle signal.

Referring also to FIG. 6, code-phase measurements and carrier-phase measurements may be used to determine location of a target UE with high precision. A carrier signal 610 is produced by a satellite, e.g., the SV 190 (FIG. 1). The carrier signal 610 (also called a carrier wave or a carrier) is a waveform used for modulation with a modulation signal to produce a new signal. Here, a PRN code signal 620 (pseudorandom noise code signal) is used by the SV 190 to modulate the carrier signal 610 to produce an SV signal 630 (satellite vehicle signal), which comprises the PRN code signal 620 and the carrier signal 610.

Figure 7:
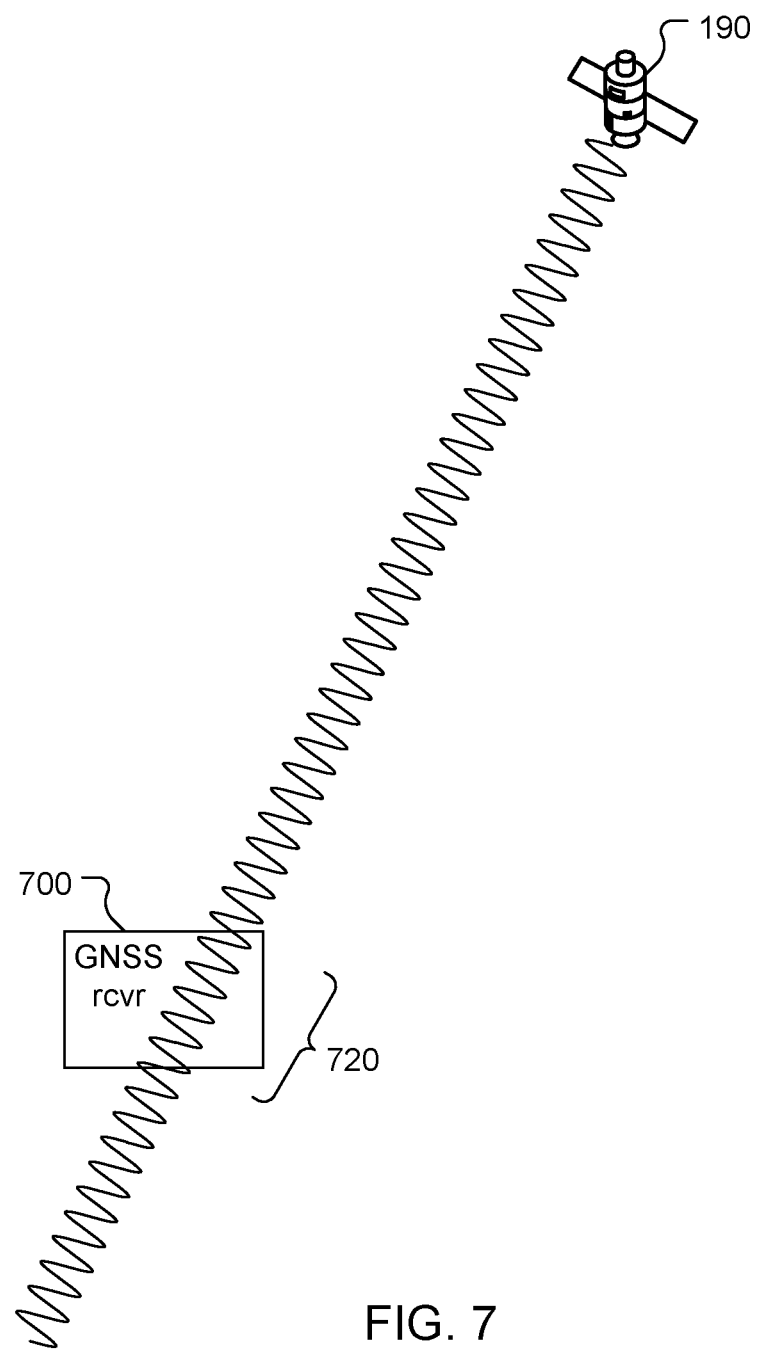
FIG. 7 is a simplified view of the carrier signal shown in FIG. 6 transmitted from a satellite to a receiver.

Referring also to FIG. 7, the SV 190 transmits the SV signal 630 to a GNSS receiver 700 (e.g., the UE 200), although only the carrier signal 610 of the SV signal 630 is shown in FIG. 7. The GNSS receiver 700 (e.g., the processor 510) can correlate the PRN code signal 620 with a stored PRN code corresponding to the SV 190 to determine a time of arrival of the PRN code signal 620. The GNSS receiver 700 can use the time of arrival to determine a time of travel between the SV 190 and the GNSS receiver 700 to determine a distance between the SV 190 and the GNSS receiver 700. The distance determined using the PRN code signal 620 typically has an error of at least several meters (e.g., 5m, 10m, or more). If, however, the GNSS receiver 700 can determine the total carrier phase of the carrier signal 610 (i.e., the number of full carrier signal cycles plus the fractional carrier phase) between the SV 190 and the GNSS receiver 700, then the GNSS receiver can determine the distance between the SV 190 and the GNSS receiver 700 much more accurately, e.g., within centimeters. The GNSS receiver 700, e.g., the carrier phase unit 550, can measure the instantaneous phase of the carrier signal 610 at the GNSS receiver 700, and use this measured phased to determine the fractional phase of the carrier signal 610 between the SV 190 and the GNSS receiver 700. The GNSS receiver 700 cannot measure the total phase of the carrier signal 610 between the SV 190 and the GNSS receiver 700, but can use one or more known techniques to determine the unknown number of full cycles of the carrier signal 610 between the SV 190 and the GNSS receiver 700. The unknown integer number of full cycles of the carrier signal 610 between the SV 190 and the GNSS receiver 700 is referred to as the GNSS integer ambiguity. Examples of techniques for solving the integer ambiguity include searching through possible integer solutions and choosing the solution with the lowest residuals, using carrier phase measurements from multiple epochs and satellite geometry (e.g., multiple satellite constellations) to estimate the GNSS receiver location, or averaging multiple independent measurements to an estimated position with the lowest noise level.

For carrier-phase-based positioning, a range (distance) from a source of a carrier signal to a receiver of the carrier signal is determined as the total carrier phase (the number of cycles, including a partial cycle (if any)) between the source and receiver multiplied by the wavelength, λ, of the carrier signal. The total carrier phase can be represented as an integer number N of full cycles between the source and receiver plus a fractional carrier phase θ divided by 2π. The fractional carrier phase θ is given by $$\theta = \theta(t) - \theta_0 \quad (1)$$

where $\theta_0$ is the initial carrier phase at the transmitter (carrier signal source) and θ(t) is the carrier phase measured at the receiver. Thus, the range ρ may be given by $$\rho = \left(N + \frac{\theta(t) - \theta_0}{2\pi}\right) * \lambda \quad (2)$$

The initial phase component can be removed from consideration by employing a double-difference technique using a reference node to measure the same satellite signal as measured by the GNSS receiver. The range may thus be determined based on the measured phase and determination of the integer number of cycles of the carrier signal 610 between the source (e.g., the SV 190) and the GNSS receiver 700.

Based on the distance between the SV 190 and the GNSS receiver 700 determined using the PRN code signal 620, the number of full cycles of the carrier signal 610 may be narrowed to a range 720 of possible numbers of full cycles. To determine the total carrier phase between the SV 190 and the GNSS receiver 700, the GNSS receiver 700 can use the distance determined using the PRN code signal 620 to set a search region, referred to as the GNSS integer ambiguity search space, for an algorithm to determine the integer number of carrier signal cycles between the SV 190 and the GNSS receiver 700. Determining a search space helps simplify the determination of the number of full cycles of the carrier signal 610, and helps the GNSS receiver 700 be able to determine the integer solution. If the GNSS receiver 700 can reduce the size of the search space (i.e., the length of the range 720) for the actual integer number of cycles to the GNSS receiver 700, then the time to solve the integer ambiguity may be decreased, and/or a solution to the integer ambiguity may be determined under conditions (e.g., SV signal multipath such as in urban canyons) in which a solution may not be possible absent reduction of the search space.

Figure 8:
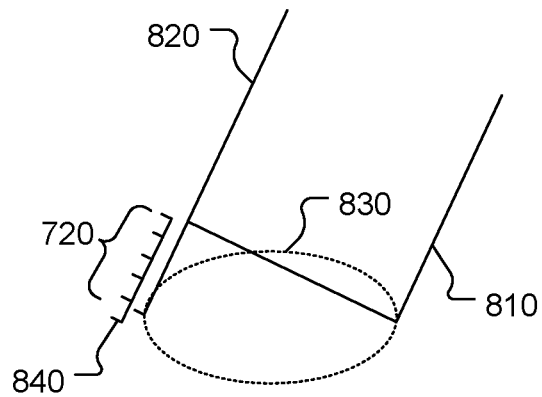
FIG. 8 is a simplified diagram of a carrier signal phase integer ambiguity and integer ambiguity search space.

Referring also to FIG. 8, the distance determined by correlating the PRN code, and an uncertainty in this distance, can be used to determine a minimum range 810 from the SV 190 to the GNSS receiver and a maximum range 820 from the SV 190 to the GNSS receiver 700. The range 720 corresponds to the difference between the maximum range 820 and the minimum range 810 and spans several cycles of the carrier signal 610 indicated by a scale 840. A two-dimensional position error ellipse 830 defines the minimum range 810 and the maximum range 820. The two-dimensional position error ellipse 830 is the projection of a three-dimensional position error ellipsoid of the position of the GNSS receiver 700 based on GNSS signals (although error volumes of shapes other than ellipsoids (e.g., irregular shapes) and/or two-dimensional projections of shapes other than ellipses may be used). The projection of the two-dimensional position error ellipse 830 onto the satellite line of sight to the GNSS receiver 700 (e.g., the line of the maximum range 820) yields the range 720, the length of which is the search space.

Figure 9:
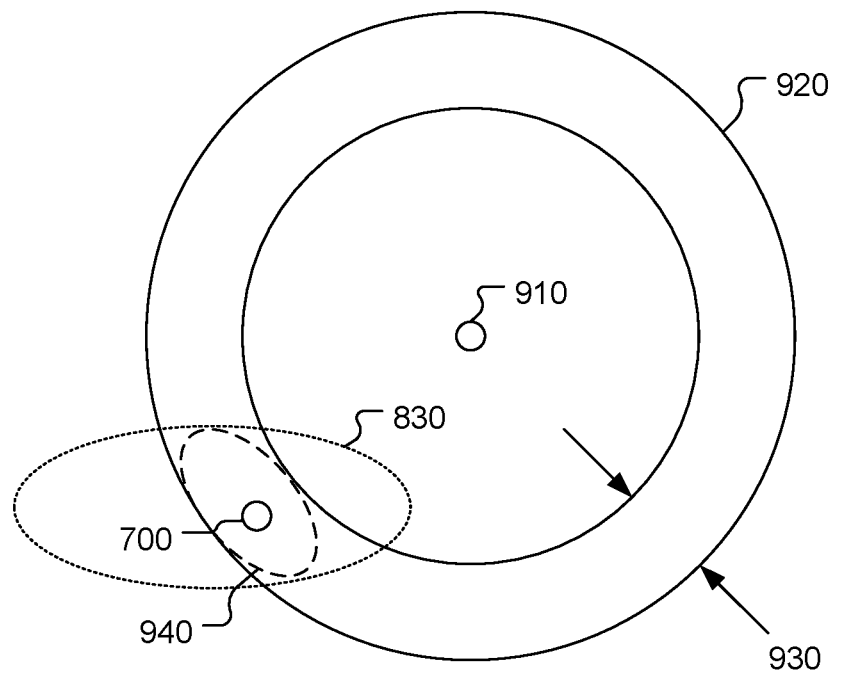
FIG. 9 is a simplified diagram of use of a range and range uncertainty to reduce an integer ambiguity search space.

Referring also to FIG. 9, a spatial uncertainty of a location of the GNSS receiver 700 relative to a terrestrial base station 910 may be determined. For example, the base station 910, e.g., the TRP 300, may transfer one or more signals (e.g., PRS) with the GNSS receiver 700 (e.g., transmit one or more signals to the GNSS receiver 700 and/or receive one or more signals from the GNSS receiver 700) to determine a range and range uncertainty relative to the base station 910.

For example, the signal transfer may be used to determine a round-trip time (RTT) for the base station 910 and the GNSS receiver 700, and an RTT uncertainty. An annulus 920 corresponds to the RTT and the RTT uncertainty, with a width 930 of the annulus 920 being dependent on the RTT uncertainty. The GNSS receiver 700, e.g., the carrier phase unit 550, can bound the integer ambiguity search space by the spatial bounds of the GNSS receiver location determined by signal transfer between the base station 910 and the GNSS receiver 700, here a distance measure corresponding to the RTT and a distance uncertainty corresponding to the RTT uncertainty. Thus, in this example, the carrier phase unit 550 bounds the integer ambiguity of the two-dimensional position error ellipse 830 by boundary of the annulus 920. The carrier phase unit 550 determines a reduced two-dimensional position error ellipse 940 based on the intersection of the two-dimensional position error ellipse 830 and the annulus 920. The carrier phase unit 550 determines an elliptical shape (e.g., the largest ellipse or the largest ellipsoid) that fits within the intersection of the two-dimensional position error ellipse 830 and the annulus 920 and sets this as the reduced two-dimensional position error ellipse 940, which has a smaller search space (projection onto the satellite line of sight). The base station 910 may be any of a variety of base stations, employing one or more signaling technologies, such that the spatial uncertainty that can be determined by signal transfer with the base station 910 is small enough to be able to limit the size of the error ellipse 830. For example, the base station 910 may be configured to transfer 5G NR PRS with the GNSS receiver 700. As another example, the base station 910 may be a WiFi base station configured to perform signal transfer according to the IEEE 802.11mc protocol for determining RTT.

Figure 10:
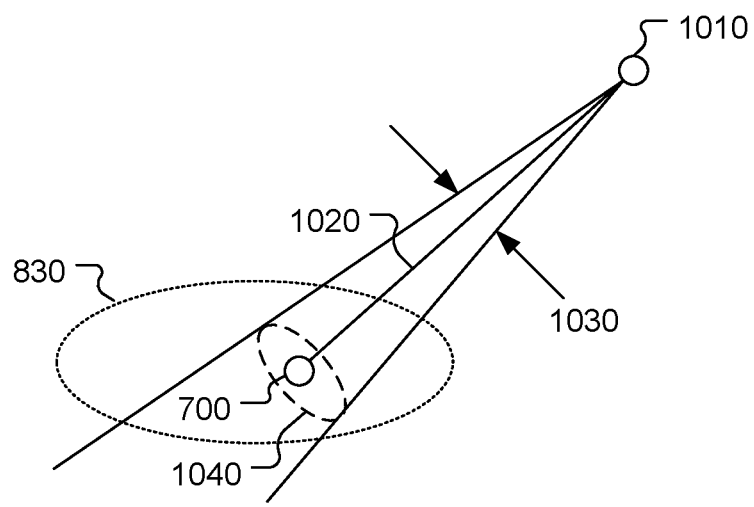
FIG. 10 is a simplified diagram of use of an angle and angle uncertainty to reduce an integer ambiguity search space.

Referring also to FIG. 10, an angular spatial uncertainty of the location of the GNSS receiver 700 relative to a terrestrial base station 1010 may be used to bound an error ellipse and thus an integer ambiguity search space. For example, the GNSS receiver 700 may transmit PRS 1020 to the terrestrial base station 1010 and the terrestrial base station 1010 can measure the PRS 1020 and determine an angle of arrival (AoA) of the PRS 1020 and an AoA uncertainty 1030 corresponding to the determined AoA. The carrier phase unit 550 may bound the error ellipse 830 by the spatial uncertainty corresponding to the AoA and AoA uncertainty to determine a reduced error ellipse 1040 with a correspondingly smaller search space than the error ellipse 830.

Figure 11:
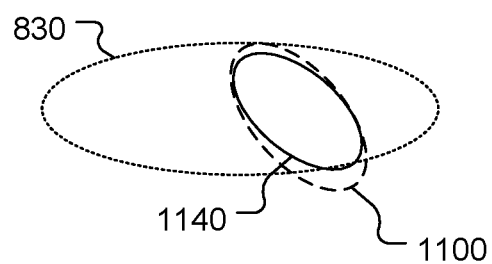
FIG. 11 is a simplified diagram of use of a position estimate and position estimate uncertainty to reduce an integer ambiguity search space.

Referring also to FIG. 11, a location estimate and corresponding location uncertainty may be used to bound an error ellipse and thus the integer ambiguity search space. For example, the GNSS receiver 700 may transfer signals with multiple base stations (not shown) such that ranges to the base stations may be determined, and triangulation used to determine a location estimate and corresponding location uncertainty, from which a location error region, here a location error ellipse 1100 may be determined. The carrier phase unit 550 may bound the error ellipse 830 with the location error ellipse 1100 to determine a reduced error ellipse 1140 with a correspondingly smaller search space than the error ellipse 830.

Figure 12:
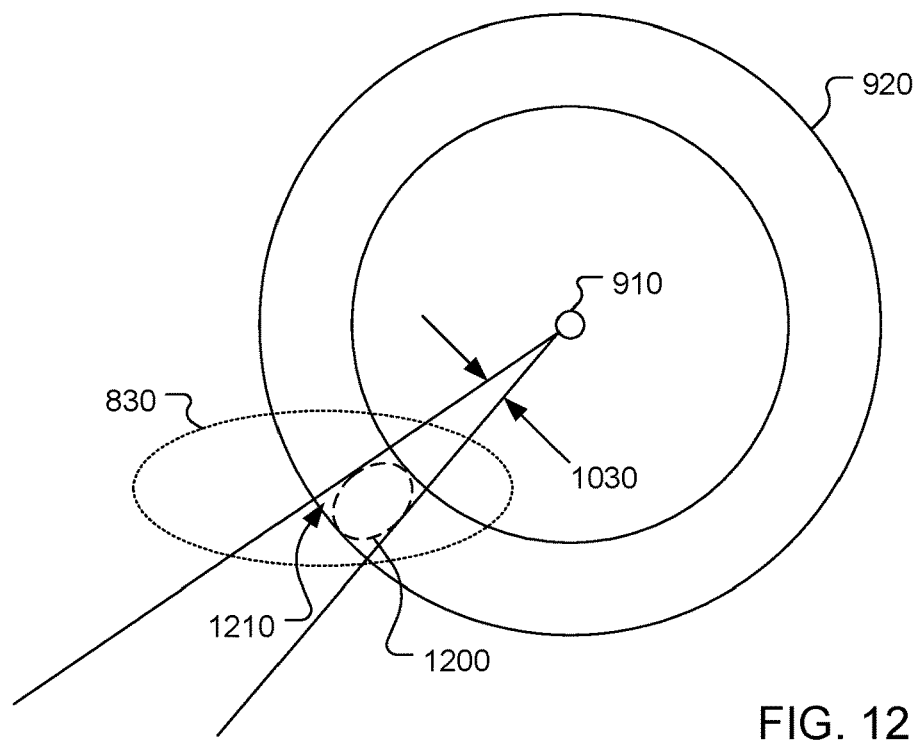
FIG. 12 is a simplified diagram of use of a combination of range and range uncertainty, and an angle and angle uncertainty to reduce an integer ambiguity search space.
Figure 13:
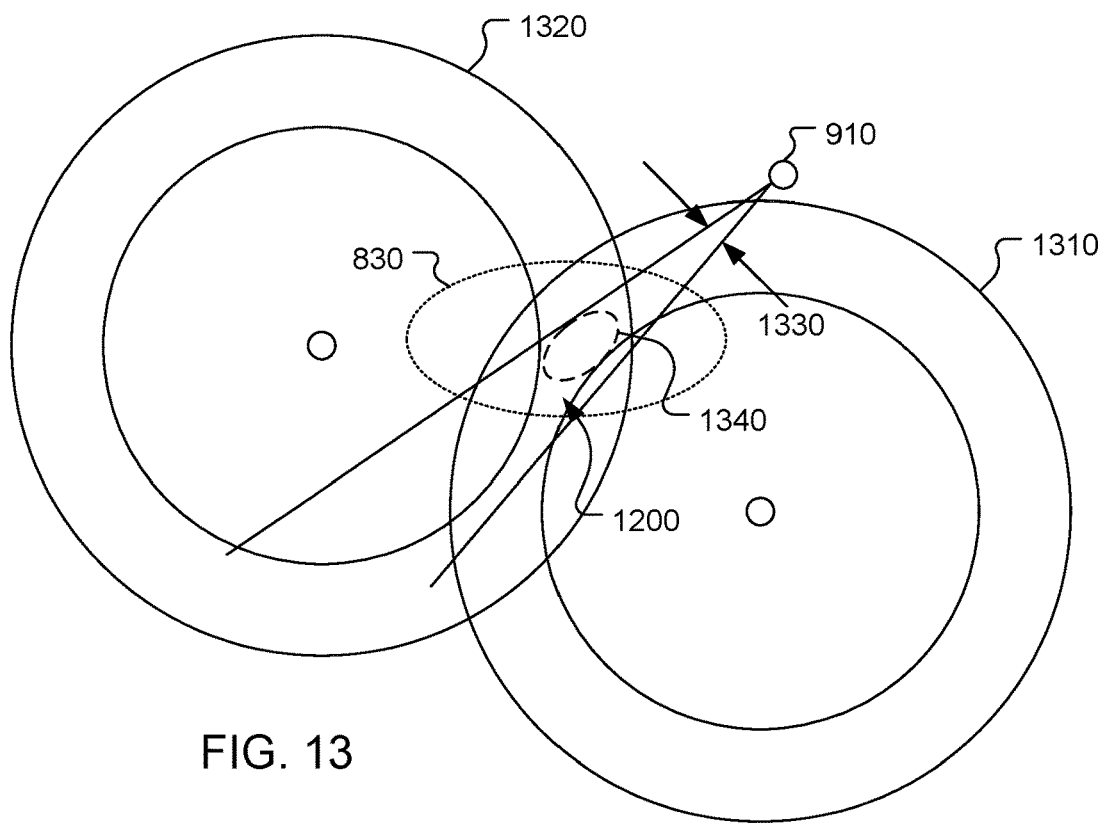
FIG. 13 is a simplified diagram of use of a combination of multiple ranges and corresponding range uncertainties, and an angle and angle uncertainty to reduce an integer ambiguity search space.

Referring also to FIGS. 12 and 13, combinations of spatial uncertainties, e.g., one or more locations and corresponding location uncertainty(ies), one or more angles and corresponding angle uncertainty(ies), and/or one or more ranges and corresponding range uncertainty(ies) may be used to bound a position error ellipse to determine an integrated error space. As shown in FIG. 12, the range and range uncertainty shown in FIG. 9 is combined with the angle and angle uncertainty shown in FIG. 10 to constrain the error ellipse 830 within an intersection region 1210 (i.e., the intersection of the annulus 920 and the angle uncertainty 1030). The carrier phase unit 550 may constrain reduce the error ellipse 830 to a reduced error ellipse 1200 (an integrated error space) the projection of which onto satellite line of sight provides a reduced search space compared to the projection of the error ellipse 830 onto satellite line of sight. Here, the error ellipse 1200 is a largest ellipse that fits within the intersection region 1210. As shown in FIG. 13, a first annulus 1310 corresponding to a first range and first range uncertainty, a second annulus 1320 corresponding to a second range and second range uncertainty, and an angle and angle uncertainty 1330 intersect over an intersection region 1350. The intersection region 1350 may be used to reduce the size of the error ellipse 830 to a reduced error ellipse 1340 with a corresponding reduced integer ambiguity search space. Here, the error ellipse 1340 is the largest ellipse that fits within the intersection region 1350.

The carrier phase unit 550 may determine an integrated error space based on an intersection of an error ellipse based on correlation of the PRN code signal 620 and one or more spatial constraints determined from signal transfer with one or more terrestrial base stations (e.g., position estimate(s), angle(s) relative to the base station(s), range(s) relative to the base station(s)). The carrier phase unit 550 may determine the largest ellipse that will fit within the intersection as an integrated error space, with the projection of this ellipse onto satellite line of sight yielding the search space.

The GNSS receiver 700, e.g., the processor 510, may use a reduced integer ambiguity search window to find the integer number of carrier phase cycles between the SV 190 and the GNSS receiver 700. The reduced integer ambiguity search window will typically be smaller than the range 720 corresponding to the error ellipse 830 determined from the uncertainty of the correlation of the PRN code signal 620 alone. Thus, the speed at which the carrier phase unit 550 solves the integer ambiguity will be faster than without spatially constraining the error ellipse 830, and/or the carrier phase unit 550 may be able to solve the integer ambiguity under conditions where solving the integer ambiguity is not possible (at least not to a threshold level of convergence and/or within a threshold amount of acceptable time). Solution of the integer ambiguity may not be possible, without reduction of the error ellipse 830, e.g., due to a very large error ellipse 830 (e.g., under multipath conditions such as an urban canyon).

The GNSS receiver 700 can use the integer number of carrier cycles between the SV 190 and the GNSS receiver 700 to determine the position of the GNSS receiver 700. For example, the processor 510 may determine the total carrier phase between the SV 190 and the UE 500, and determine the range (to a high degree of accuracy, e.g., within centimeters) between the SV 190 and the UE 500. The processor 510 may use this range, and ranges to other satellites and/or ranges to one or more terrestrial base stations (e.g., if an insufficient quantity of ranges to satellites is known for a position estimate of the UE 500) to determine a position estimate for the UE 500 for mobile-based positioning. Also or alternatively, for mobile-assisted positioning, the UE 500 may provide position information (e.g., raw measurement(s) and/or processed measurement information (e.g., range(s)) to another device, such as a location server, for determination of the position estimate.

Figure 14:
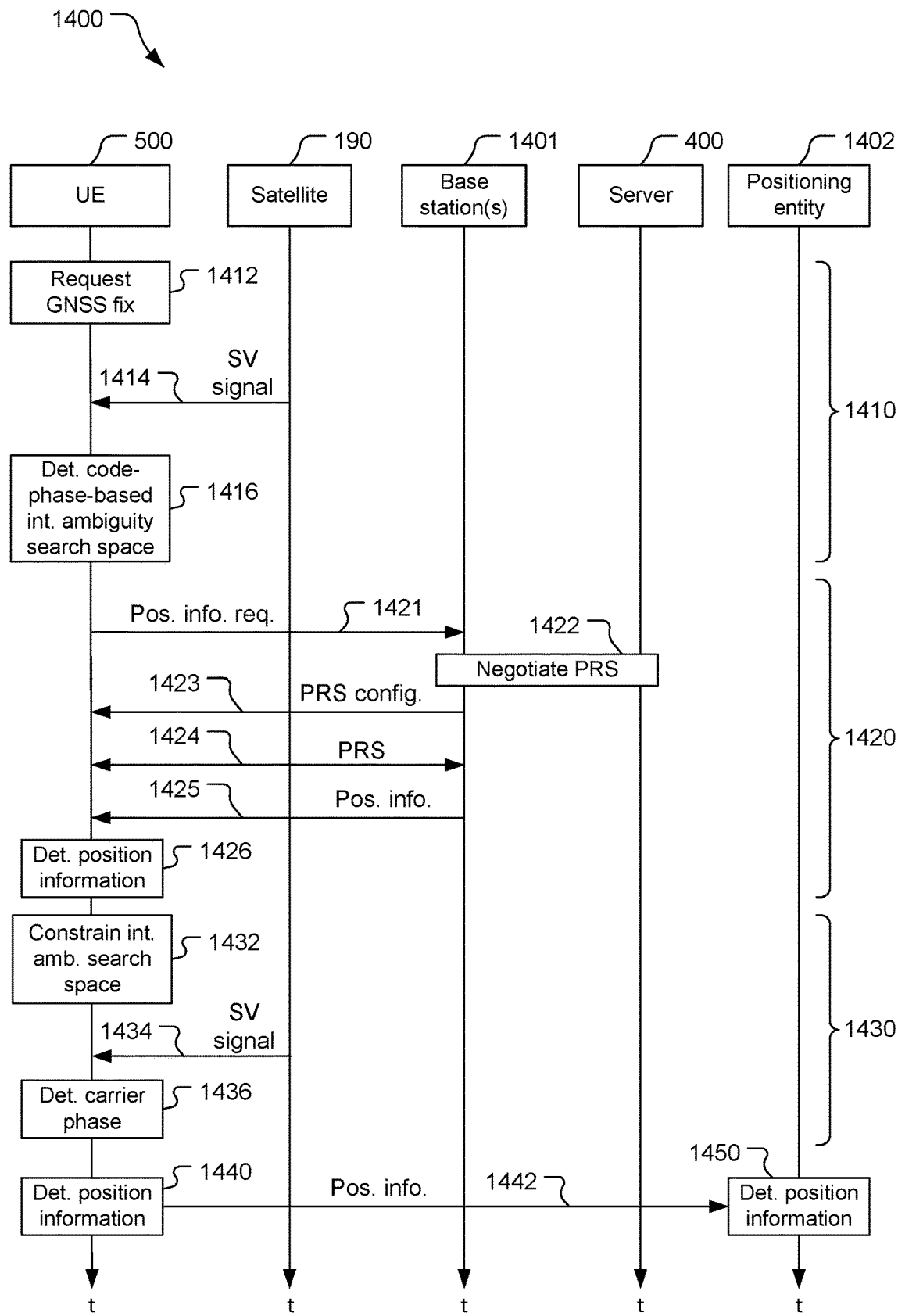
FIG. 14 is a signaling and process flow diagram for measuring carrier phase, and determining position information based on carrier phase measurements.

Referring to FIG. 14, with further reference to FIGS. 1-13, a signaling and process flow 1400 for measuring carrier phase, and determining position information based on carrier phase measurements, includes the stages shown. In the flow 1400, signals are transferred between the SV 190, the UE 500 (e.g., an example of the GNSS receiver 700), one or more base stations 1401, and a positioning entity 1402. The positioning entity 1402 may be a standalone entity or a part of an entity (e.g., a UE, a TRP, a server).

At stage 1410, a location of the UE 500 is requested and a preliminary integer ambiguity search space determined for resolving a carrier signal integer ambiguity. As sub-stage 1412, the UE 500 requests a GNSS fix. The request may be initiated internally, e.g., an application requesting a location of the UE 500. The request may be initiated externally, e.g., a location services (LCS) client requesting location of the UE 500 and the LCS (e.g., in the server 400) sending a request to the UE 500. The SV 190 sends an SV signal 1414 that the UE 500 receives (e.g., by the interface 520 such as the SPS antenna 262 and the SPS receiver 217). At sub-stage 1416, the UE 500, e.g., the carrier phase unit 550, determines a code-phase-based integer ambiguity search space. For example, the UE 500 correlates a PRN code with the SV signal 630 to determine an approximate location of the UE 500 and an integer ambiguity search space, e.g., the range 720 corresponding to the error ellipse 830, for resolving the integer number of cycles of the carrier signal 610 between the SV 190 and the UE 500.

At stage 1420, the UE 500 obtains spatial information regarding location of the UE 500 based on terrestrial-based signaling. The UE 500 may send a position information request 1421 to the base station(s) 1401 for position information (e.g., one or more position measurements, one or more ranges between base station and the UE 500, one or more angles of the UE 500 relative to one or more base stations, etc.). The base station(s) 1401 may respond by sending position information 1425 to the UE 500 if the position information is already known. Also or alternatively, the base station(s) 1401 may perform operations to transfer PRS with the UE 500 (e.g., transmit PRS to the UE 500 and/or receive PRS from the UE 500) from which position information can be determined. For example, at sub-stage 1422, the base station(s) 1401 negotiate with the server 400 to determine one or more PRS schedules for PRS transfer between the base station(s) 1401 and the UE 500. The base station(s) 1401 transmit the PRS configuration(s) 1423 to the UE 500. The UE 500 and the base station(s) 1401 transfer PRS 1424 (e.g., bidirectionally, e.g., to determine RTT, or unidirectionally, e.g., to determine AoA at the base station(s) 1401). The base station(s) 1401 may determine position information such as range to the UE 500 and corresponding range uncertainty, angle to the UE and angle uncertainty, position estimate for the UE 500 and position uncertainty. The base station(s) 1401 transmit the position information 1425 to the UE 500. Also or alternatively, at sub-stage 1426 the carrier phase unit 550 may determine position information (e.g., PRS measurement(s), range(s), position estimate(s)) from one or more PRS received by the UE 500. Also or alternatively, at sub-stage 1426 the carrier phase unit 550 may retrieve position information from the memory 530 if position information has previously been obtained and stored in the memory 530. The transfer of PRS is an example and not required. For example, the base station(s) 1401 may include one or more WiFi base stations (e.g., IEEE 802.11mc base station(s)) with which the UE 500 may transfer signals to determine position information, e.g., RTT from which range(s) and range uncertainty(ies) may be determined.

At stage 1430, the carrier phase unit 550 determines the total carrier phase of the carrier signal 610 from the SV 190 to the UE 500. At sub-stage 1432, the carrier phase unit 550 uses the position information obtained at stage 1420 to constrain the error ellipse 830 to a reduced error ellipse with a corresponding reduced search space and uses the reduced search space to determine a solution to the integer ambiguity. While in the flow 1400, the error ellipse 830 is determined and then reduced based on the position information, this order is an example and not a required order. For example, position information based on terrestrial signaling may be determined and used to constrain the determination of an error ellipse based on correlation to the PRN code signal 620. The size of the satellite positioning system carrier phase integer ambiguity search space may be constrained based on spatial information determined using multiple techniques and/or using signal transfer with multiple base stations. For example, the search space may be limited using range uncertainty from a base station to the apparatus and angular uncertainty of the apparatus relative to the base station. As another example, the search space may be limited using range uncertainties from multiple base stations to the apparatus. As another example, the search space may be limited using angular uncertainties of the apparatus relative to multiple base stations. The search space may be limited using one or more range uncertainties from one or more base stations to the apparatus and/or one or more angular uncertainties of the apparatus relative to one or more base stations. The SV 190 transmits an SV signal 1434 to the UE 500 that the carrier phase unit 550 measures. At sub-stage 1436, the carrier phase unit 550 determines the total carrier phase of the SV signal 1434 from the SV 190 to the UE 500 using the reduced integer ambiguity search space to solve the integer ambiguity and using the measured carrier phase and a known technique (e.g., double differencing) to determine the fractional carrier phase. Using the reduced integer ambiguity search space may speed the convergence of the integer ambiguity solution, speeding the determination of a range between the SV 190 and the UE 500, and/or enabling convergence of the integer ambiguity solution under conditions where convergence would not occur without constraint of the error ellipse 830.

At stage 1440, the UE 500 determines position information based on the determined carrier phase. The position information may be the determined carrier phase, or information derived from the determined carrier phase such as range to the SV 190. The flow 1400 may be repeated for one or more other satellites to obtain carrier phase information for multiple satellites and thus ranges to multiple satellites. The UE 500 may use the ranges to the satellites to determine a position of the UE 500 if a sufficient number of ranges are determined, or the UE 500 may combine the range(s) to the satellite(s) with other position information (e.g., one or more ranges to one or more terrestrial base stations, one or more angles relative to one or more terrestrial base stations, etc.) to determine a position estimate for the UE 500. The UE 500 may transmit position information 1442 to the positioning entity 1402.

At stage 1450, the positioning entity 1402 determines position information for the UE 500 (e.g., a position estimate) based the position information 1442 (e.g., measurements, total carrier phase to each of one or more satellites, etc.). The positioning entity 1402 may combine multiple pieces of position information, e.g., measurements and/or ranges, to determine further position information, e.g., a position estimate. The positioning entity 1402 may provide position information determined by the positioning entity 1402 to one or more other entities, e.g., the server 400, the UE 500, etc.

Figure 15:
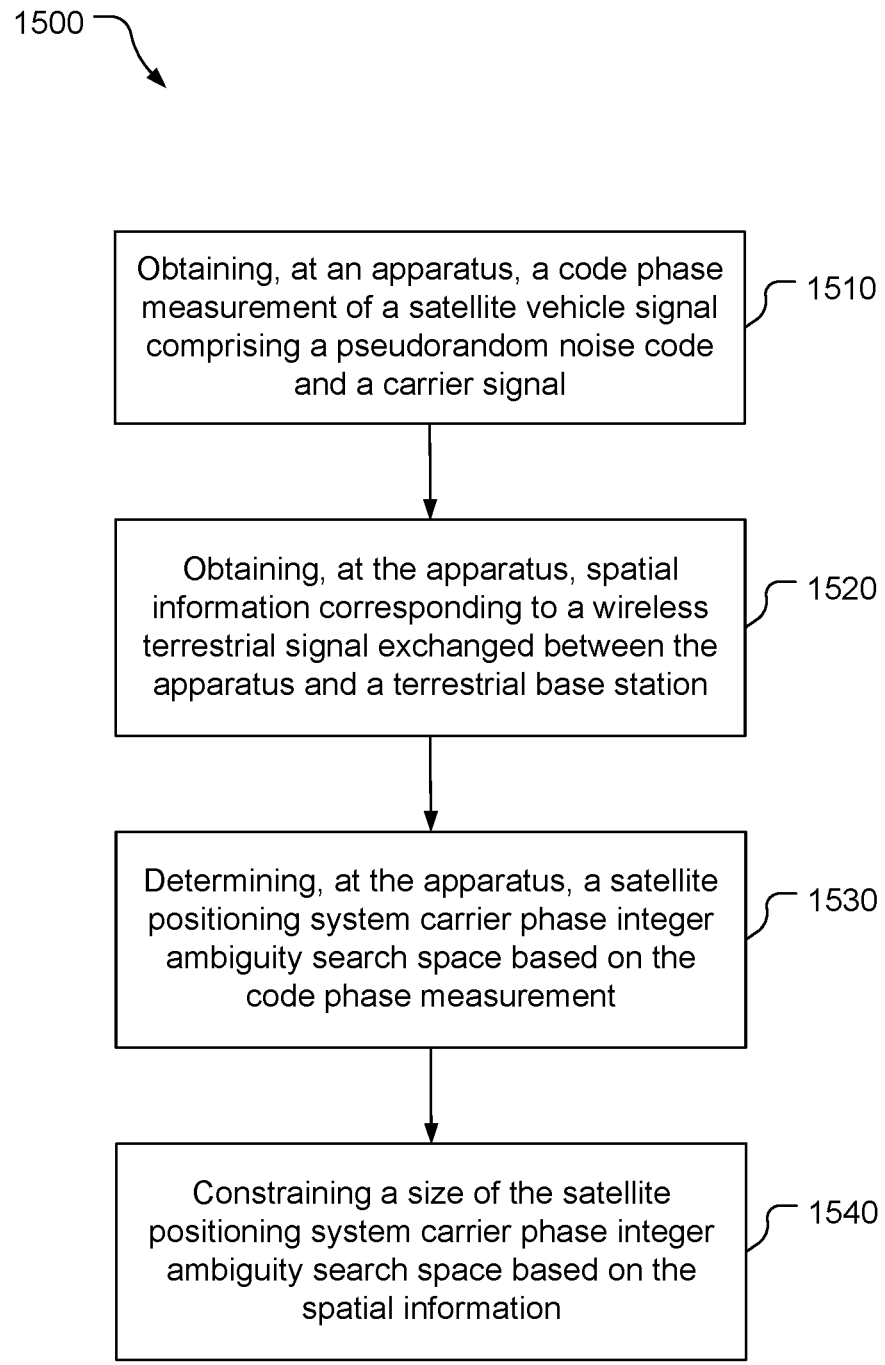
FIG. 15 is a block flow diagram of a method of determining an integer ambiguity search space.

Referring to FIG. 15, with further reference to FIGS. 1-14, a method 1500 of determining an integer ambiguity search space includes the stages shown. The method 1500 is, however, an example only and not limiting. The method 1500 may be altered, e.g., by having stages added, removed, rearranged, combined, performed concurrently, and/or having single stages split into multiple stages.

At stage 1510, the method 1500 includes obtaining, at an apparatus, a code phase measurement of a satellite vehicle signal comprising a pseudorandom noise code and a carrier signal. For example, the UE 500 receives the SV signal 1414 (e.g., the SV signal 630 including the PRN code signal 620) at stage 1410. The processor 510, possibly including the memory 530, in combination with the interface 520 (e.g., the SPS receiver 217 and the SPS antenna 262) may comprise means for obtaining the code phase measurement.

At stage 1520, the method 1500 includes obtaining, at the apparatus, spatial information corresponding to a wireless terrestrial signal transferred between the apparatus and a terrestrial base station. For example, the UE 500 receives the position information 1425 from the base station 1401, retrieves position information from the memory 530, and/or determines position information at sub-stage 1432 based on spatial information determined from one or more signals (e.g., PRS) transferred between the UE 500 and the base station(s) 1401, e.g., at stage 1420. The processor 510, possibly in combination with the memory 530, possibly in combination with the interface 520 (e.g., the wireless transmitter 242 and the antenna 246 and/or the wireless receiver 244 and the antenna 246) may comprise means for obtaining the spatial information.

At stage 1530, the method 1500 includes determining, at the apparatus, a satellite positioning system carrier phase integer ambiguity search space based on the code phase measurement. For example, the carrier phase unit 550 may determine the error ellipse 830 based on a range and range uncertainty determined from measuring the PRN code signal 620 and determine the range 720 of the search space based on the error ellipse 830. The processor 510, possibly in combination with the memory 530, may comprise means for determining the satellite positioning system carrier phase integer ambiguity search space.

At stage 1540, the method 1500 includes constraining a size of the satellite positioning system carrier phase integer ambiguity search space based on the spatial information. For example, the carrier phase unit 550 may determine an intersection of the error ellipse 830 and spatial information such as one or more ranges and corresponding range uncertainty(ies) of the UE 500 relative to one or more base stations, one or more angles and corresponding angle uncertainty(ies) of the UE 500 relative to one or more base stations, and/or a position estimate and position uncertainty for the UE 500 based on terrestrial signal transfer. The carrier phase unit 550 may determine the error ellipse 830 and then limit the size of an error ellipse based on the spatial information, or the carrier phase unit 550 may constrain determination of the error ellipse 830 based on the spatial information. The carrier phase unit 550 may determine an integer ambiguity search space based on the constrained error ellipse, e.g., by projecting the constrained error ellipse onto a line of sight of a satellite. Thus, constraining the error ellipse constrains the integer ambiguity search space. The processor 510, possibly in combination with the memory 530, may comprise means for determining the constraining a size of the satellite positioning system carrier phase integer ambiguity search space. Constraining the size of the satellite positioning system carrier phase integer ambiguity search space may speed the convergence of a solution for the integer ambiguity, thus improving positioning speed and reducing latency. Also or alternatively, constraining the size of the satellite positioning system carrier phase integer ambiguity search space may enable convergence of the integer ambiguity solution under conditions where convergence would not occur (e.g., at all or within an acceptable amount of time) absent the constraint on the size of the integer ambiguity search space.

Implementations of the method 1500 may include one or more of the following features. In an example implementation, the spatial information comprises a range uncertainty of a location of the apparatus relative to the terrestrial base station. For example, the spatial information may comprise an annulus, such as the annulus 920, or a three-dimensional range uncertainty (e.g., a spherical shell or a portion thereof, a spherical shell being a generalization of an annulus to three dimensions and comprising a region between two concentric spheres). In a further example implementation, the method 1500 includes: transmitting a first positioning reference signal to the terrestrial base station; measuring a second positioning reference signal received from the terrestrial base station; and obtaining a round trip time uncertainty corresponding to the first positioning reference signal and the second positioning reference signal as the range uncertainty. For example, the UE 500 and the base station 1401 transfer the PRS 1424, measure the PRS 1424, and determine an RTT between the UE 500 and the base station 1401. Either the base station 1401, or the UE 500, or another entity (e.g., the server 400) may determine the RTT. The RTT may be provided to the UE 500 from another entity that determines the RTT. The processor 510, possibly in combination with the memory 530, in combination with the interface 520 (e.g., the wireless transmitter 242 and the antenna 246) may comprise means for transmitting the first PRS. The processor 510, possibly in combination with the memory 530, in combination with the interface 520 (e.g., the wireless receiver 242 and the antenna 246) may comprise means for measuring the second PRS. The processor 510, possibly in combination with the memory 530, possibly in combination with the interface 520 (e.g., the wireless receiver 244 and the antenna 246) may comprise means for obtaining the RTT. In another further example implementation, the range uncertainty is less than two meters. For example, 5G NR positioning (or more accurate terrestrial-based positioning) is used to determine the spatial information to provide a range uncertainty of less than two meters to help reduce the integer ambiguity search space. In another further example implementation, the spatial information comprises a plurality of range uncertainties of the apparatus relative to a plurality of terrestrial base stations. For example, as shown in FIG. 13, multiple range uncertainties relative to multiple reference points, e.g., base stations, may be used to determine (e.g., constrain) a integer ambiguity search space.

Also to alternatively, implementations of the method 1500 may include one or more of the following features. In an example implementation, the spatial information comprises an angular uncertainty of a location of the apparatus relative to the terrestrial base station. For example, the spatial information that may be used to constrain the size of the integer ambiguity search space is an angular uncertainty such as the AoA uncertainty 1030 or the angle uncertainty 1330 that can be used alone or in combination with other spatial information to constrain an integer ambiguity search space (e.g., by constraining an error ellipse). In a further example implementation, the spatial information comprises a plurality of angular uncertainties of the location of the apparatus relative to a plurality of terrestrial base stations. In another further example implementation, the spatial information comprises a range uncertainty of the location of the apparatus relative to the terrestrial base station. For example, as shown in FIG. 13, both range/range uncertainty and angle/angle uncertainty can be used to determine an integer ambiguity search space. In another example implementation, determining the satellite positioning system carrier phase integer ambiguity search space comprises determining an intersection region, the intersection region being an intersection of an unconstrained satellite positioning system error space based on the code phase measurement and an uncertainty region of a location of the apparatus corresponding to the spatial information. For example, the carrier phase unit 550 may determine the intersection of the error ellipse 830 and one or more position/position uncertainty combinations. The intersection may further be an intersection with one or more angle/angle uncertainty combinations and/or one or more range/range uncertainty combinations. In a further example implementation, determining the satellite positioning system carrier phase integer ambiguity search space comprises determining the satellite positioning system carrier phase integer ambiguity search space based on a largest ellipse that fits within the intersection region. The intersection may be a many sided, irregularly-shaped region, and the carrier phase unit 550 may determine the integer ambiguity search space as the satellite line-of-sight projection of the largest ellipse that fits within the intersection region, e.g., the intersection region 1210 or the intersection region 1350.

IMPLEMENTATION EXAMPLES

Implementation examples are provided in the following numbered clauses.

Clause 1. An apparatus comprising:
a receiver;
a memory; and
a processor communicatively coupled to the receiver and the memory and configured to:
 obtain a code phase measurement of a satellite vehicle signal received via the receiver, the satellite vehicle signal comprising a pseudorandom noise code and a carrier signal;
 obtain spatial information corresponding to a wireless terrestrial signal transferred between the apparatus and a terrestrial base station; and
 determine a satellite positioning system carrier phase integer ambiguity search space based on the code phase measurement;
 wherein the processor is configured to constrain a size of the satellite positioning system carrier phase integer ambiguity search space based on the spatial information.

Clause 2. The apparatus of clause 1, wherein the spatial information comprises a range uncertainty of a location of the apparatus relative to the terrestrial base station.

Clause 3. The apparatus of clause 2, further comprising a transceiver than includes the receiver, and wherein the processor is configured to:
 transmit a first positioning reference signal to the terrestrial base station;
 measure a second positioning reference signal received from the terrestrial base station via the receiver; and
 obtain a round trip time uncertainty corresponding to the first positioning reference signal and the second positioning reference signal as the range uncertainty.

Clause 4. The apparatus of clause 2, wherein the range uncertainty is less than two meters.

Clause 5. The apparatus of clause 2, wherein the spatial information comprises a plurality of range uncertainties of the apparatus relative to a plurality of terrestrial base stations.

Clause 6. The apparatus of clause 1, wherein the spatial information comprises an angular uncertainty of a location of the apparatus relative to the terrestrial base station.

Clause 7. The apparatus of clause 6, wherein the spatial information comprises a plurality of angular uncertainties of the location of the apparatus relative to a plurality of terrestrial base stations.

Clause 8. The apparatus of clause 6, wherein the spatial information comprises a range uncertainty of the location of the apparatus relative to the terrestrial base station.

Clause 9. The apparatus of clause 1, wherein to determine the satellite positioning system carrier phase integer ambiguity search space the processor is configured to determine an intersection region, the intersection region being an intersection of an unconstrained satellite positioning system error space based on the code phase measurement and an uncertainty region of a location of the apparatus corresponding to the spatial information.

Clause 10. The apparatus of clause 9, wherein the processor is configured to determine the satellite positioning system carrier phase integer ambiguity search space based on a largest ellipse that fits within the intersection region.

Clause 11. A method of determining an integer ambiguity search space, the method comprising:
 obtaining, at an apparatus, a code phase measurement of a satellite vehicle signal comprising a pseudorandom noise code and a carrier signal;
 obtaining, at the apparatus, spatial information corresponding to a wireless terrestrial signal transferred between the apparatus and a terrestrial base station;
 determining, at the apparatus, a satellite positioning system carrier phase integer ambiguity search space based on the code phase measurement; and
 constraining a size of the satellite positioning system carrier phase integer ambiguity search space based on the spatial information.

Clause 12. The method of clause 11, wherein the spatial information comprises a range uncertainty of a location of the apparatus relative to the terrestrial base station.

Clause 13. The method of clause 12, further comprising:
 transmitting a first positioning reference signal to the terrestrial base station;
 measuring a second positioning reference signal received from the terrestrial base station; and
 obtaining a round trip time uncertainty corresponding to the first positioning reference signal and the second positioning reference signal as the range uncertainty.

Clause 14. The method of clause 12, wherein the range uncertainty is less than two meters.

Clause 15. The method of clause 12, wherein the spatial information comprises a plurality of range uncertainties of the apparatus relative to a plurality of terrestrial base stations.

Clause 16. The method of clause 11, wherein the spatial information comprises an angular uncertainty of a location of the apparatus relative to the terrestrial base station.

Clause 17. The method of clause 16, wherein the spatial information comprises a plurality of angular uncertainties of the location of the apparatus relative to a plurality of terrestrial base stations.

Clause 18. The method of clause 16, wherein the spatial information comprises a range uncertainty of the location of the apparatus relative to the terrestrial base station.

Clause 19. The method of clause 11, wherein determining the satellite positioning system carrier phase integer ambiguity search space comprises determining an intersection region, the intersection region being an intersection of an unconstrained satellite positioning system error space based on the code phase measurement and an uncertainty region of a location of the apparatus corresponding to the spatial information.

Clause 20. The method of clause 19, wherein determining the satellite positioning system carrier phase integer ambiguity search space comprises determining the satellite positioning system carrier phase integer ambiguity search space based on a largest ellipse that fits within the intersection region.

Clause 21. An apparatus comprising:
means for obtaining a code phase measurement of a satellite vehicle signal comprising a pseudorandom noise code and a carrier signal;
means for obtaining spatial information corresponding to a wireless terrestrial signal transferred between the apparatus and a terrestrial base station;
means for determining a satellite positioning system carrier phase integer ambiguity search space based on the code phase measurement; and
means for constraining a size of the satellite positioning system carrier phase integer ambiguity search space based on the spatial information.

Clause 22. The apparatus of clause 21, wherein the spatial information comprises a range uncertainty of a location of the apparatus relative to the terrestrial base station.

Clause 23. The apparatus of clause 22, further comprising:
means for transmitting a first positioning reference signal to the terrestrial base station;
means for measuring a second positioning reference signal received from the terrestrial base station; and
means for obtaining a round trip time uncertainty corresponding to the first positioning reference signal and the second positioning reference signal as the range uncertainty.

Clause 24. The apparatus of clause 22, wherein the range uncertainty is less than two meters.

Clause 25. The apparatus of clause 22, wherein the spatial information comprises a plurality of range uncertainties of the apparatus relative to a plurality of terrestrial base stations.

Clause 26. The apparatus of clause 21, wherein the spatial information comprises an angular uncertainty of a location of the apparatus relative to the terrestrial base station.

Clause 27. The apparatus of clause 26, wherein the spatial information comprises a plurality of angular uncertainties of the location of the apparatus relative to a plurality of terrestrial base stations.

Clause 28. The apparatus of clause 26, wherein the spatial information comprises a range uncertainty of the location of the apparatus relative to the terrestrial base station.

Clause 29. The apparatus of clause 21, wherein the means for determining the satellite positioning system carrier phase integer ambiguity search space comprise means for determining an intersection region, the intersection region being an intersection of an unconstrained satellite positioning system error space based on the code phase measurement and an uncertainty region of a location of the apparatus corresponding to the spatial information.

Clause 30. The apparatus of clause 29, wherein the means for determining the satellite positioning system carrier phase integer ambiguity search space comprise means for determining the satellite positioning system carrier phase integer ambiguity search space based on a largest ellipse that fits within the intersection region.

Clause 31. A non-transitory, processor-readable storage medium comprising processor-readable instructions to cause a processor, of an apparatus, to:
obtain a code phase measurement of a satellite vehicle signal comprising a pseudorandom noise code and a carrier signal;
obtain spatial information corresponding to a wireless terrestrial signal transferred between the apparatus and a terrestrial base station;
determine a satellite positioning system carrier phase integer ambiguity search space based on the code phase measurement; and
constrain a size of the satellite positioning system carrier phase integer ambiguity search space based on the spatial information.

Clause 32. The storage medium of clause 31, wherein the spatial information comprises a range uncertainty of a location of the apparatus relative to the terrestrial base station.

Clause 33. The storage medium of clause 32, further comprising processor-readable instructions to cause the processor to:
transmit a first positioning reference signal to the terrestrial base station;
measure a second positioning reference signal received from the terrestrial base station; and
obtain a round trip time uncertainty corresponding to the first positioning reference signal and the second positioning reference signal as the range uncertainty.

Clause 34. The storage medium of clause 32, wherein the range uncertainty is less than two meters.

Clause 35. The storage medium of clause 32, wherein the spatial information comprises a plurality of range uncertainties of the apparatus relative to a plurality of terrestrial base stations.

Clause 36. The storage medium of clause 31, wherein the spatial information comprises an angular uncertainty of a location of the apparatus relative to the terrestrial base station.

Clause 37. The storage medium of clause 36, wherein the spatial information comprises a plurality of angular uncertainties of the location of the apparatus relative to a plurality of terrestrial base stations.

Clause 38. The storage medium of clause 36, wherein the spatial information comprises a range uncertainty of the location of the apparatus relative to the terrestrial base station.

Clause 39. The storage medium of clause 31, wherein the processor-readable instructions to cause the processor to determine the satellite positioning system carrier phase integer ambiguity search space comprise processor-readable instructions to cause the processor to determine an intersection region, the intersection region being an intersection of an unconstrained satellite positioning system error space based on the code phase measurement and an uncertainty region of a location of the apparatus corresponding to the spatial information.

Clause 40. The storage medium of clause 39, wherein the processor-readable instructions to cause the processor to determine the satellite positioning system carrier phase integer ambiguity search space comprise processor-readable instructions to cause the processor to determine the satellite positioning system carrier phase integer ambiguity search space based on a largest ellipse that fits within the intersection region.

Clause 41. An apparatus comprising:
a receiver;
a memory; and
a processor communicatively coupled to the receiver and the memory and configured to:
  obtain a code phase measurement of a satellite vehicle signal received via the receiver, the satellite vehicle signal comprising a pseudorandom noise code and a carrier signal;
  obtain spatial information corresponding to a wireless terrestrial signal transferred between the apparatus and a terrestrial base station; and
  determine a satellite positioning system carrier phase integer ambiguity search space based on the code phase measurement;
wherein the processor is configured to constrain a size of the satellite positioning system carrier phase integer ambiguity search space based on the spatial information.

Clause 42. The apparatus of clause 41, wherein the spatial information comprises a range uncertainty of a location of the apparatus relative to the terrestrial base station.

Clause 43. The apparatus of clause 42, further comprising a transceiver than includes the receiver, and wherein the processor is configured to:
  transmit a first positioning reference signal to the terrestrial base station;
  measure a second positioning reference signal received from the terrestrial base station via the receiver; and
  obtain a round trip time uncertainty corresponding to the first positioning reference signal and the second positioning reference signal as the range uncertainty.

Clause 44. The apparatus of clause 42 or clause 43, wherein the range uncertainty is less than two meters.

Clause 45. The apparatus of clause 42, wherein the spatial information comprises a plurality of range uncertainties of the apparatus relative to a plurality of terrestrial base stations.

Clause 46. The apparatus of any of clauses 41-45, wherein the spatial information comprises an angular uncertainty of a location of the apparatus relative to the terrestrial base station.

Clause 47. The apparatus of clause 46, wherein the spatial information comprises a plurality of angular uncertainties of the location of the apparatus relative to a plurality of terrestrial base stations.

Clause 48. The apparatus of any one of clauses 41-47, wherein to determine the satellite positioning system carrier phase integer ambiguity search space the processor is configured to determine an intersection region, the intersection region being an intersection of an unconstrained satellite positioning system error space based on the code phase measurement and an uncertainty region of a location of the apparatus corresponding to the spatial information.

Clause 49. The apparatus of clause 48, wherein the processor is configured to determine the satellite positioning system carrier phase integer ambiguity search space based on a largest ellipse that fits within the intersection region.

Clause 50. A method of determining an integer ambiguity search space, the method comprising:
  obtaining, at an apparatus, a code phase measurement of a satellite vehicle signal comprising a pseudorandom noise code and a carrier signal;
  obtaining, at the apparatus, spatial information corresponding to a wireless terrestrial signal transferred between the apparatus and a terrestrial base station;
  determining, at the apparatus, a satellite positioning system carrier phase integer ambiguity search space based on the code phase measurement; and
  constraining a size of the satellite positioning system carrier phase integer ambiguity search space based on the spatial information.

Clause 51. The method of clause 50, wherein the spatial information comprises a range uncertainty of a location of the apparatus relative to the terrestrial base station.

Clause 52. The method of clause 51, further comprising:
  transmitting a first positioning reference signal to the terrestrial base station;
  measuring a second positioning reference signal received from the terrestrial base station; and
  obtaining a round trip time uncertainty corresponding to the first positioning reference signal and the second positioning reference signal as the range uncertainty.

Clause 53. The method of clause 51 or clause 52, wherein the range uncertainty is less than two meters.

Clause 54. The method of clause 51, wherein the spatial information comprises a plurality of range uncertainties of the apparatus relative to a plurality of terrestrial base stations.

Clause 55. The method of any of clauses 50-54, wherein the spatial information comprises an angular uncertainty of a location of the apparatus relative to the terrestrial base station.

Clause 56. The method of clause 55, wherein the spatial information comprises a plurality of angular uncertainties of the location of the apparatus relative to a plurality of terrestrial base stations.

Clause 57. The method of any one of clauses 50-56, wherein determining the satellite positioning system carrier phase integer ambiguity search space comprises determining an intersection region, the intersection region being an intersection of an unconstrained satellite positioning system error space based on the code phase measurement and an uncertainty region of a location of the apparatus corresponding to the spatial information.

Clause 58. The method of clause 57, wherein determining the satellite positioning system carrier phase integer ambiguity search space comprises determining the satellite positioning system carrier phase integer ambiguity search space based on a largest ellipse that fits within the intersection region.

Clause 59. An apparatus comprising:
  means for obtaining a code phase measurement of a satellite vehicle signal comprising a pseudorandom noise code and a carrier signal;
  means for obtaining spatial information corresponding to a wireless terrestrial signal transferred between the apparatus and a terrestrial base station;
  means for determining a satellite positioning system carrier phase integer ambiguity search space based on the code phase measurement; and
  means for constraining a size of the satellite positioning system carrier phase integer ambiguity search space based on the spatial information.

Clause 60. The apparatus of clause 59, wherein the spatial information comprises a range uncertainty of a location of the apparatus relative to the terrestrial base station.

Clause 61. The apparatus of clause 60, further comprising:
means for transmitting a first positioning reference signal to the terrestrial base station;
means for measuring a second positioning reference signal received from the terrestrial base station; and
means for obtaining a round trip time uncertainty corresponding to the first positioning reference signal and the second positioning reference signal as the range uncertainty.

Clause 62. The apparatus of clause 60 or clause 61, wherein the range uncertainty is less than two meters.

Clause 63. The apparatus of clause 60, wherein the spatial information comprises a plurality of range uncertainties of the apparatus relative to a plurality of terrestrial base stations.

Clause 64. The apparatus of any of clauses 59-63, wherein the spatial information comprises an angular uncertainty of a location of the apparatus relative to the terrestrial base station.

Clause 65. The apparatus of clause 64, wherein the spatial information comprises a plurality of angular uncertainties of the location of the apparatus relative to a plurality of terrestrial base stations.

Clause 66. The apparatus of any one of clauses 59-65, wherein the means for determining the satellite positioning system carrier phase integer ambiguity search space comprise means for determining an intersection region, the intersection region being an intersection of an unconstrained satellite positioning system error space based on the code phase measurement and an uncertainty region of a location of the apparatus corresponding to the spatial information.

Clause 67. The apparatus of clause 66, wherein the means for determining the satellite positioning system carrier phase integer ambiguity search space comprise means for determining the satellite positioning system carrier phase integer ambiguity search space based on a largest ellipse that fits within the intersection region.

Clause 68. A non-transitory, processor-readable storage medium comprising processor-readable instructions to cause a processor, of an apparatus, to:
obtain a code phase measurement of a satellite vehicle signal comprising a pseudorandom noise code and a carrier signal;
obtain spatial information corresponding to a wireless terrestrial signal transferred between the apparatus and a terrestrial base station;
determine a satellite positioning system carrier phase integer ambiguity search space based on the code phase measurement; and
constrain a size of the satellite positioning system carrier phase integer ambiguity search space based on the spatial information.

Clause 69. The storage medium of clause 68, wherein the spatial information comprises a range uncertainty of a location of the apparatus relative to the terrestrial base station.

Clause 70. The storage medium of clause 69, further comprising processor-readable instructions to cause the processor to:
transmit a first positioning reference signal to the terrestrial base station;
measure a second positioning reference signal received from the terrestrial base station; and
obtain a round trip time uncertainty corresponding to the first positioning reference signal and the second positioning reference signal as the range uncertainty.

Clause 71. The storage medium of clause 69 or clause 70, wherein the range uncertainty is less than two meters.

Clause 72. The storage medium of clause 69, wherein the spatial information comprises a plurality of range uncertainties of the apparatus relative to a plurality of terrestrial base stations.

Clause 73. The storage medium of any of clauses 68-72, wherein the spatial information comprises an angular uncertainty of a location of the apparatus relative to the terrestrial base station.

Clause 74. The storage medium of clause 73, wherein the spatial information comprises a plurality of angular uncertainties of the location of the apparatus relative to a plurality of terrestrial base stations.

Clause 75. The storage medium of any of clauses 68-74, wherein the processor-readable instructions to cause the processor to determine the satellite positioning system carrier phase integer ambiguity search space comprise processor-readable instructions to cause the processor to determine an intersection region, the intersection region being an intersection of an unconstrained satellite positioning system error space based on the code phase measurement and an uncertainty region of a location of the apparatus corresponding to the spatial information.

Clause 76. The storage medium of clause 75, wherein the processor-readable instructions to cause the processor to determine the satellite positioning system carrier phase integer ambiguity search space comprise processor-readable instructions to cause the processor to determine the satellite positioning system carrier phase integer ambiguity search space based on a largest ellipse that fits within the intersection region.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
a receiver;
a memory; and
a processor communicatively coupled to the receiver and the memory and configured to:
obtain a code phase measurement of a satellite vehicle signal received via the receiver, the satellite vehicle signal comprising a pseudorandom noise code and a carrier signal;
obtain spatial information corresponding to a wireless terrestrial signal transferred between the apparatus and a terrestrial base station; and
determine a satellite positioning system carrier phase integer ambiguity search space based on an intersection region, wherein the intersection region being an intersection of an unconstrained satellite positioning system error space based on the code phase measurement and an uncertainty region of a location of the apparatus corresponding to the spatial information.

2. The apparatus of claim 1, wherein the spatial information comprises a range uncertainty of a location of the apparatus relative to the terrestrial base station.

3. The apparatus of claim 2, further comprising a transceiver than includes the receiver, and wherein the processor is configured to:
  transmit a first positioning reference signal to the terrestrial base station;
  measure a second positioning reference signal received from the terrestrial base station via the receiver; and
  obtain a round trip time uncertainty corresponding to the first positioning reference signal and the second positioning reference signal as the range uncertainty.

4. The apparatus of claim 2, wherein the range uncertainty is less than two meters.

5. The apparatus of claim 2, wherein the spatial information comprises a plurality of range uncertainties of the apparatus relative to a plurality of terrestrial base stations.

6. The apparatus of claim 1, wherein the spatial information comprises an angular uncertainty of a location of the apparatus relative to the terrestrial base station.

7. The apparatus of claim 6, wherein the spatial information comprises a plurality of angular uncertainties of the location of the apparatus relative to a plurality of terrestrial base stations.

8. The apparatus of claim 6, wherein the spatial information comprises a range uncertainty of the location of the apparatus relative to the terrestrial base station.

9. The apparatus of claim 1, wherein the satellite positioning system carrier phase integer ambiguity search space is based on a largest ellipse that fits within the intersection region.

10. A method of determining an integer ambiguity search space, the method comprising:
  obtaining, at an apparatus, a code phase measurement of a satellite vehicle signal comprising a pseudorandom noise code and a carrier signal;
  obtaining, at the apparatus, spatial information corresponding to a wireless terrestrial signal transferred between the apparatus and a terrestrial base station;
  determining, at the apparatus, a satellite positioning system carrier phase integer ambiguity search space based on an intersection region, wherein the intersection region being an intersection of an unconstrained satellite positioning system error space based on the code phase measurement and an uncertainty region of a location of the apparatus corresponding to the spatial information.

11. The method of claim 10, wherein the spatial information comprises a range uncertainty of a location of the apparatus relative to the terrestrial base station.

12. The method of claim 11, further comprising:
  transmitting a first positioning reference signal to the terrestrial base station;
  measuring a second positioning reference signal received from the terrestrial base station; and
  obtaining a round trip time uncertainty corresponding to the first positioning reference signal and the second positioning reference signal as the range uncertainty.

13. The method of claim 11, wherein the range uncertainty is less than two meters.

14. The method of claim 11, wherein the spatial information comprises a plurality of range uncertainties of the apparatus relative to a plurality of terrestrial base stations.

15. The method of claim 10, wherein the spatial information comprises an angular uncertainty of a location of the apparatus relative to the terrestrial base station.

16. The method of claim 15, wherein the spatial information comprises a plurality of angular uncertainties of the location of the apparatus relative to a plurality of terrestrial base stations.

17. The method of claim 15, wherein the spatial information comprises a range uncertainty of the location of the apparatus relative to the terrestrial base station.

18. The method of claim 11, wherein satellite positioning system carrier phase integer ambiguity search space is based on a largest ellipse that fits within the intersection region.

19. An apparatus comprising:
  means for obtaining a code phase measurement of a satellite vehicle signal comprising a pseudorandom noise code and a carrier signal;
  means for obtaining spatial information corresponding to a wireless terrestrial signal transferred between the apparatus and a terrestrial base station;
  means for determining a satellite positioning system carrier phase integer ambiguity search space based on an intersection region, wherein the intersection region being an intersection of an unconstrained satellite positioning system error space based on the code phase measurement and an uncertainty region of a location of the apparatus corresponding to the spatial information.

20. The apparatus of claim 19, wherein the spatial information comprises a range uncertainty of a location of the apparatus relative to the terrestrial base station.

21. The apparatus of claim 20, further comprising:
  means for transmitting a first positioning reference signal to the terrestrial base station;
  means for measuring a second positioning reference signal received from the terrestrial base station; and
  means for obtaining a round trip time uncertainty corresponding to the first positioning reference signal and the second positioning reference signal as the range uncertainty.

22. The apparatus of claim 20, wherein the range uncertainty is less than two meters.

23. The apparatus of claim 19, wherein the spatial information comprises an angular uncertainty of a location of the apparatus relative to the terrestrial base station.

24. The apparatus of claim 19, wherein the satellite positioning system carrier phase integer ambiguity search space is based on a largest ellipse that fits within the intersection region.

25. A non-transitory, processor-readable storage medium comprising processor-readable instructions to cause a processor, of an apparatus, to:
  obtain a code phase measurement of a satellite vehicle signal comprising a pseudorandom noise code and a carrier signal;
  obtain spatial information corresponding to a wireless terrestrial signal transferred between the apparatus and a terrestrial base station;
  determine a satellite positioning system carrier phase integer ambiguity search space based on an intersection region, wherein the intersection region being an intersection of an unconstrained satellite positioning system error space based on the code phase measurement and an uncertainty region of a location of the apparatus corresponding to the spatial information.

26. The storage medium of claim 25, wherein the spatial information comprises a range uncertainty of a location of the apparatus relative to the terrestrial base station.

27. The storage medium of claim 25, wherein the spatial information comprises an angular uncertainty of a location of the apparatus relative to the terrestrial base station.

28. The storage medium of claim 25, wherein the satellite positioning system carrier phase integer ambiguity search space is based on a largest ellipse that fits within the intersection region.

\* \* \* \* \*